United States Patent [19]
Frykhult

[11] Patent Number: 6,065,608
[45] Date of Patent: May 23, 2000

[54] APPARATUS FOR FILTERING LIQUIDS

[75] Inventor: Rune H Frykhult, Stockholm, Sweden

[73] Assignee: Nordic Water Products AB, Nynashamn, Sweden

[21] Appl. No.: 09/202,900

[22] PCT Filed: Jul. 10, 1997

[86] PCT No.: PCT/SE97/01257

§ 371 Date: Feb. 10, 1999

§ 102(e) Date: Feb. 10, 1999

[87] PCT Pub. No.: WO98/01206

PCT Pub. Date: Jan. 15, 1998

[30]  Foreign Application Priority Data

Jul. 10, 1996  [SE]  Sweden ................................ 9602726

[51] Int. Cl.[7] ................................................. B01D 33/067
[52] U.S. Cl. ........................ 210/403; 210/433.1; 210/541
[58] Field of Search .................................. 210/394, 402, 210/403, 433.1, 541, 542

[56]  References Cited

U.S. PATENT DOCUMENTS

| | | | |
|---|---|---|---|
| 3,797,663 | 3/1974 | Borrdale | 210/402 |
| 4,294,700 | 10/1981 | Casper . | |
| 4,821,536 | 4/1989 | Bardsley | 210/402 |
| 5,667,680 | 9/1997 | Haeffner | 210/403 |
| 5,733,450 | 3/1998 | Langner | 210/403 |

FOREIGN PATENT DOCUMENTS 0026661  4/1981  European Pat. Off. .

*Primary Examiner*—Christopher Upton
*Attorney, Agent, or Firm*—Nixon & Vanderhye P.C.

[57]  ABSTRACT

An apparatus for filtering liquids comprises a hollow body which is rotatable about a horizontal axis. Liquid to be filtered is supplied into the interior of the rotating hollow body so that filtrate flows by gravity through filter material of the hollow body into a filtrate container. A sealing structure seals between a stationary circumferential wall, which defines a liquid supplying chamber, and a circumferential liquid impervious wall of the hollow body. Wall structures are arranged to prevent unfiltered liquid leaking past the sealing structure from entering the filtrate container.

18 Claims, 4 Drawing Sheets

APPARATUS FOR FILTERING LIQUIDS

CROSS-REFERENCE TO RELATED APPLICATION

This is the U.S. national phase of PCT/SE97/01257 filed Jul. 10, 1997.

BACKGROUND AND SUMMARY OF THE INVENTION

The present invention relates to an apparatus or filtering liquids, comprising a hollow body having a wall of filter material, and a stationary support structure on which the hollow body is journalled by means of a first bearing at a first side of the hollow body and a second bearing at a second side of the hollow body opposite said first side, such that the hollow body is rotatable about a horizontal axis, the hollow body forming a circumferential liquid impervious wall, at said second side, extending axially a distance from said wall of filter material and defining a circular opening, which is coaxial with said axis, the support structure forming a liquid supplying chamber partly defined by a stationary circumferential wall, which is close to but spaced from said liquid impervious wall and which at least partly extends along the boundary of said circular opening of the hollow body. There is an inlet to said supplying chamber for a liquid to be filtered. Sealing means are arranged to seal between said circumferential liquid impervious wall and said stationary circumferential wall of the supplying chamber, whereby liquid to be filtered entering said inlet during operation passes the supplying chamber and said circular opening into the interior of the hollow body, from which a filtrate penetrates the wall of filter material. A coarse fraction discharge means is arranged to convey a coarse fraction of the liquid to be filtered from the interior of the hollow body through said supplying chamber out of the apparatus, and a filtrate container is arranged to receive filtrate from the hollow body through said upper opening and has an outlet for discharging filtrate.

This type of prior art filtering apparatus, in which the liquid to be filtered is supplied to the interior of the hollow body so that filtrate flows by gravity through the filter material in the direction out of the hollow body, is suited for filtering a variety of liquids, such as raw water, polluted water and in particular suspensions developed in the pulp and paper processing industry. Coarse particles of undesired material, such as fine fibres and fibre fragments, deposit on the filter material inside the hollow body during operation and are usually removed from top of the hollow body by means of spray nozzles operating from outside the hollow body, so that the coarse fraction discharge means may convey the removed particles out of the apparatus. An important use of this type of filtering apparatus is to clean warm so-called white water obtained in the pulp and paper processing industry. Cleaned warm white-water is re-used as liquid for operating fine cleansing spray nozzles in various parts of pulp and paper processing systems, which reduces the consumption of fresh water and energy.

A problem of this type of filtering apparatus, however, is that the function of the sealing means is difficult to survey. Normally, a minor insignificant liquid leakage past the sealing means occurs during operation, which is acceptable. On the other hand, if the sealing means is more or less damaged or worn the leakage of unfiltered liquid past the sealing means can be quite significant, which of course is not acceptable. As a result, a mal-functioning sealing means can be in operation for a while, so that unfiltered liquid escapes past the sealing means and pollutes the filtrate in the filtrate container. In the case of filtering white-water, fibre residues in the filtrate could clogg said fine cleansing spray nozzles resulting in disturbances in the pulp or paper making process.

The object of the present invention is to provide a filtering apparatus of the above described type, in which the risk of unfiltered liquid polluting the filtrate is eliminated.

This object is fulfilled by the apparatus presented initially, which is characterised in that wall means are arranged to prevent unfiltered liquid leaking past the sealing means from entering the filtrate container.

Said wall means preferably comprises a leakage liquid guiding wall element arranged to guide liquid leaking past the sealing means away from the filtrate container. The leakage liquid wall element may slope in the direction away from the filtrate container.

As an alternative to or in combination with said guiding wall element, said wall means may comprise said circumferential liquid impervious wall formed to extend axially beyond an upper opening of the filtrate container, said sealing means sealing between said stationary circumferential wall and said circumferential liquid impervious wall such that liquid leaking past the sealing means flows by gravity axially outside of said upper opening of the filtrate container.

The support structure may form a leakage chamber arranged to receive liquid leaking past the sealing means. Any liquid received in the leakage chamber may suitably be pumped back to the liquid supplying chamber.

It is preferred that the sealing means comprises a resilient sealing member, which is attached to the stationary circumferential wall of the supplying chamber and which abuts against said circumferential liquid impervious wall of the rotatable hollow body. The sealing member is bent from the circumferential wall of the supplying chamber radially inwardly to said circumferential liquid impervious wall, in order to gain the advantage that hydrostatic pressure exerted from liquid present in the supplying chamber and the hollow body may aid the sealing member to firmly seal against the circumferential liquid impervious wall of the rotatable hollow body.

To make the sealing member capable of adjusting its sealing position so that it seals even if the circumferential liquid impervious wall of the hollow body rotates eccentrically about said horizontal axis, the sealing member suitably abuts against a sealing surface of the circumferential liquid impervious wall which forms an angle to a horizontal line in a longitudinal cross-section through the hollow body which is in the range of 15°–90°.

According to one embodiment of the invention, the circumferential liquid impervious wall has a radial inwardly directed flange defining said circular opening, the sealing member abutting against the flange. According to another preferred embodiment of the invention, the circumferential liquid impervious wall has a conical inwardly facing surface, against which the sealing member abuts.

Said second bearing preferably is a slide bearing, the circumferential liquid impervious wall being externally supported by the slide bearing. Suitably, a further sealing means seals between the hollow body and the filtrate container, in order to prevent filtrate from contacting and damage the slide bearing. Said further sealing means suitably seals between a first cylindrical wall element arranged on the hollow body outside of said circumferential liquid impervious wall and a second truncated cylindrical wall element arranged on the filtrate container, or may comprise a resilient sealing member, which is attached to the filtrate container and which abuts against the rotatable hollow body. The support structure may advantageously form a leakage passage arranged to conduct filtrate leaking past said further sealing means to the leakage chamber.

As an alternative, the apparatus of the invention may be provided with the above-described arrangement of liquid supplying chamber, circumferential liquid impervious wall, sealing means, slide bearing and leakage chamber at both sides of the hollow body.

DETAILED DESCRIPTION OF THE DRAWINGS

Figure 1:
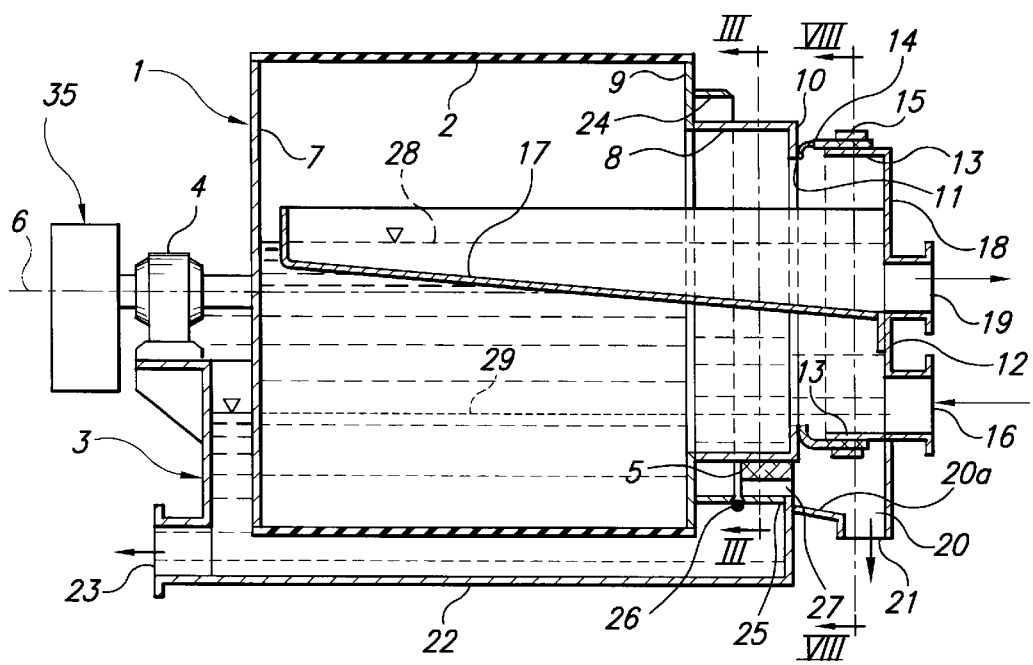
FIG. 1 is a longitudinal cross-section through an apparatus of the invention.

In FIG. 1 there is shown a filtering apparatus according to the present invention, comprising a hollow body in the form of a cylindrical drum 1 having a mantle wall 2 of filter material, such as cloth made of metallic material or plastics. The drum 1 is journalled on a stationary support structure 3 by means of a roller bearing 4 at one side of the drum 1 and a substantially semi-circular slide bearing 5 at the opposite side of the drum 1, so that the drum 1 is rotatable about a horizontal axis 6, which coincides with the centre axis of the cylindrical drum 1. The drum 1 has a solid gable wall 7 at said one side of the drum 1 and is provided with a cylindrical liquid impervious wall 8 having a smaller diameter than the mantle wall 2. The cylindrical wall 8 is coaxial with said horizontal axis 6 and extends outwardly from an annular gable wall 9 at said opposite side of the drum 1, the cylindrical wall 8 being supported by the slide bearing 5. A radial inwardly directed flange 10, which defines a circular opening 11, is provided on the wall 8. A motor 35 is coupled to the drum 1 for rotating the latter about said horizontal axis 6.

Figure 8:
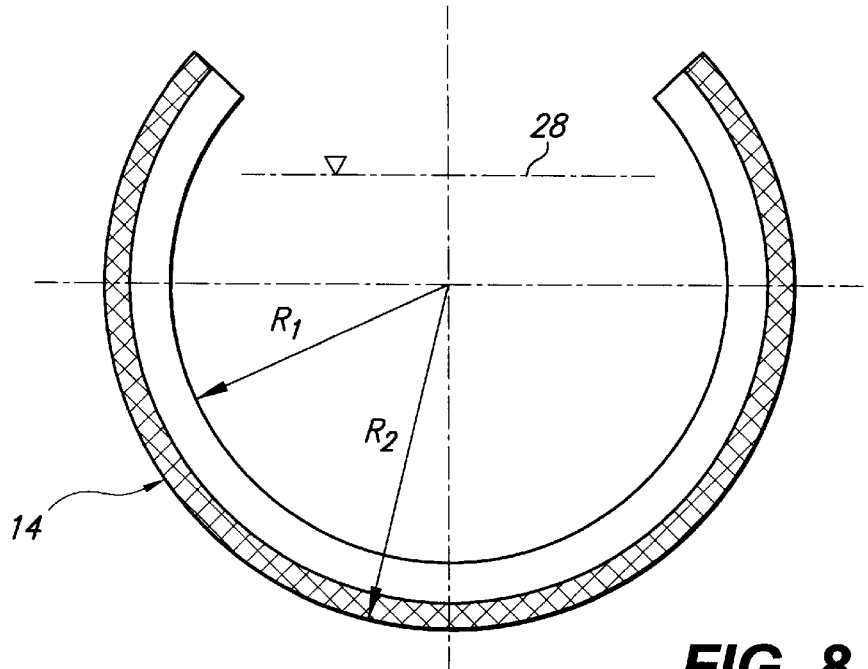
FIG. 8 is an enlarged sectional view of a somewhat modified sealing means as seen along line VIII—VIII in FIG. 1.

The support structure 3 forms a liquid supplying chamber 12 partly defined by a truncated cylindrical wall 13 which is concentric with the cylindrical wall 8 and which is close to but spaced from the latter. A resilient band-shaped (see FIG. 8) sealing member 14 suitably having the same length as the truncated cylindrical wall 13 is clamped to the latter by means of a hose clip 15 and abuts against a surface 10a of the flange 10 of the rotatable cylindrical wall 8. The sealing member 14 is bent from the stationary wall 13 radially inwardly to the flange 10 of the rotatable wall 8, or in other words the radius R1 from the horizontal axis 6 to the edge of the sealing member 14 which abuts against the surface 10a is shorter than the radius R2 from the horizontal axis 6 to a point where the sealing member 14 contacts the hose clip 15, see FIG. 4. There is an inlet 16 to the chamber 12, for a liquid to be filtered.

A chute 17 extends from a side wall 18 of the chamber 12 into the drum 1, or receiving coarse particles dropping from top of the mantle wall 2. There is an outlet 19 in the side wall 18 for discharging a coarse fraction of the liquid from the chute 17.

The support structure 3 forms a leakage chamber 20 below the sealing member 14 for receiving unfiltered liquid that might escape past the sealing member 14. The leakage chamber 20 is provided with an outlet 21 for discharging unfiltered liquid.

The support structure 3 also forms a filtrate container 22 for receiving filtrate penetrating the mantle wall 2 of filter material. A filtrate outlet 23 is provided for discharging filtrate from the filtrate container 22. The cylindrical wall 8 of the drum 1 extends axially beyond a filtrate receiving upper opening of the filtrate container 22 . The sealing member 14 abuts against the surface 10a of the flange 10 and, consequently, any unfiltered liquid leaking past the sealing member 14 flows by gravity axially outside of the upper opening of the filtrate container 22. In addition to this, there is a wall element 20a in the leakage chamber 20 sloping in the direction away from the filtrate container 22, in order to guide any unfiltered liquid leaking past the sealing member 14 away from the filtrate container 22. Alternatively, the leakage chamber 20 with its outlet 21 may be replaced by a separate receptacle outside of the filtrate container 22.

The drum 1 is provided with a solid cylindrical wall element 24, which extends from the annular gable wall 9 and which surrounds the cylindrical wall 8 concentrically with the latter. A truncated cylindrical wall element 25 on the filtrate container 22 seals against the cylindrical wall element 24 via a sealing member 26 arranged in a V-groove 26a. The support structure 3 forms a passage 27 which extends through the bottom of the slide bearing 5, so that filtrate leaking past the sealing member 26 can flow to the leakage chamber 20.

In operation liquid to be filtered is supplied through the inlet 16 at a rate such that the liquid level in the drum 1 does not exceed a maximum level 28, which is below the opening of the chute 17. The drum 1 is rotated by the motor 35, so that coarse particles deposited on the inside of the mantle wall 2 is lifted up above the liquid in the drum 1 and drop into the chute 17. Spray nozzles (not shown) may also be provided to spray liquid jets on top of the mantle wall 2, in order to facilitate the removal of deposited coarse particles from the filter material. Filtrate flows by gravity through the mantle wall 2 of filter material into the filtrate container 22. Should the filtrate level in the filtrate container 22 get higher than the lowest portion of the truncated cylindrical wall element 25, such as to a level 29, the sealing member 26 prevents filtrate from flowing to the slide bearing 5. Any minor filtrate leakage past the sealing member 26 is conducted through the passage 27 to the leakage chamber 20. In addition to this, any minor liquid leakage past the sealing member 14 is also collected in the leakage chamber 20. The mixture of liquid and filtrate collected in the leakage chamber 20 is discharged through the leakage outlet 21 and suitably fed back to the liquid inlet 16.

Figure 2:
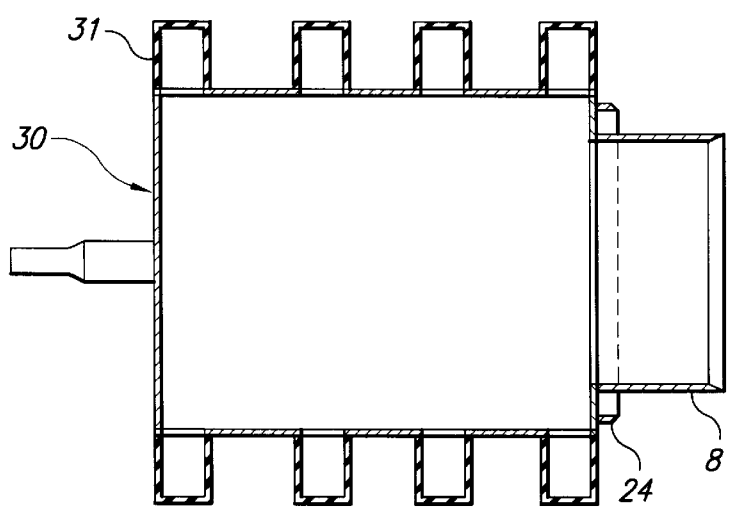
FIG. 2 is a longitudinal cross-section through a modification of the rotatable hollow body of the apparatus of FIG. 1.
Figure 3:
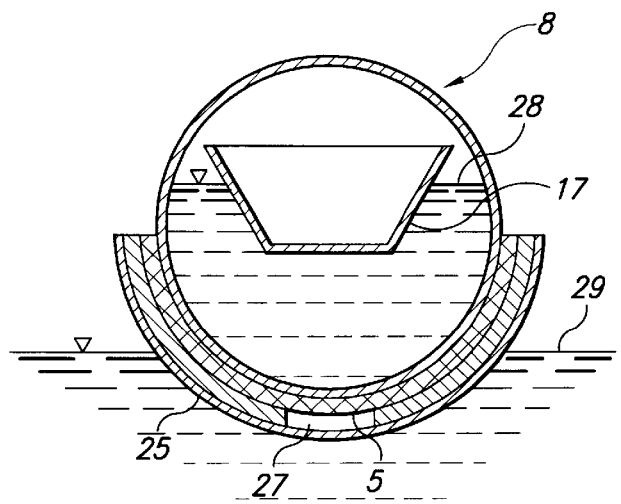
FIG. 3 is a cross-section along line III—III in FIG. 1.

FIG. 2 shows a modified hollow body 30, in which the filter material forms four annular discs 31, which increases the operative filtering area, as compared with the drum 1.

Figure 5:
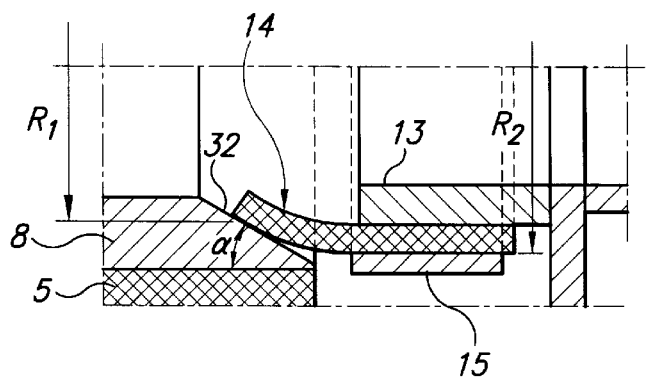
FIG. 5 is a modification of the sealing means shown in FIG. 4.
Figure 6:
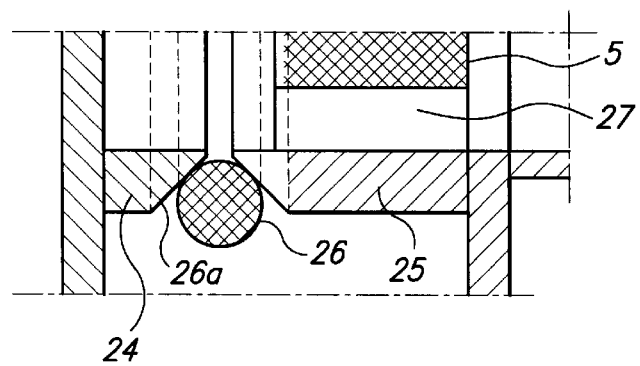
FIG. 6 is an enlarged detail of FIG. 1 showing another sealing means.

FIG. 5 shows a modification of the sealing arrangement between the hollow body 1, 30 and the liquid inlet chamber 12, comprising a conical inwardly facing surface 32 on the cylindrical wall 8, the sealing member 14 abutting against the surface 32.

Figure 4:
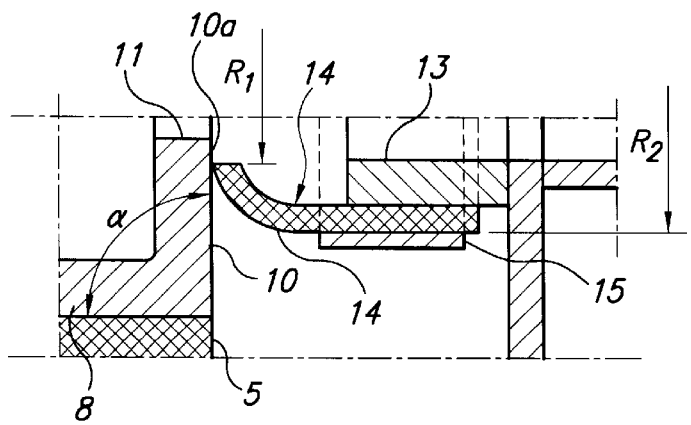
FIG. 4 is an enlarged detail of FIG. 1 showing a sealing means.

In general, the sealing surface against which the sealing member 14 abuts (the surface 10a of the flange 10, as shown in the embodiment of FIG. 4, or the surface 32, as shown to the embodiment of FIG. 5) should preferably form an angle a to a horizontal line in a longitudinal cross-section through the apparatus which is in the range of 15°–90°.

Figure 7:
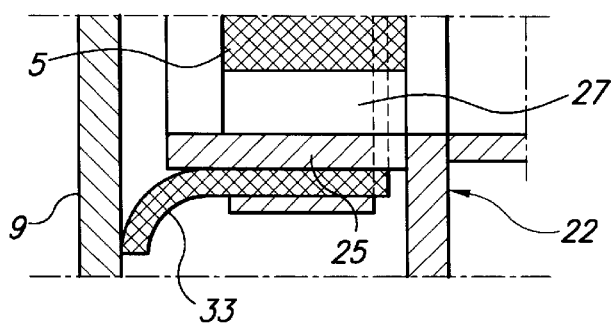
FIG. 7 is a modification of the sealing means shown in FIG. 6.

FIG. 7 shows a modification of the sealing arrangement between the hollow body 1, 30 and the filtrate container 22. In this case the cylindrical wall on the annular gable wall 9 is omitted and a sealing member 33 of the same type as the sealing member 14 abuts directly against the annular gable wall 9.

Figure 9:
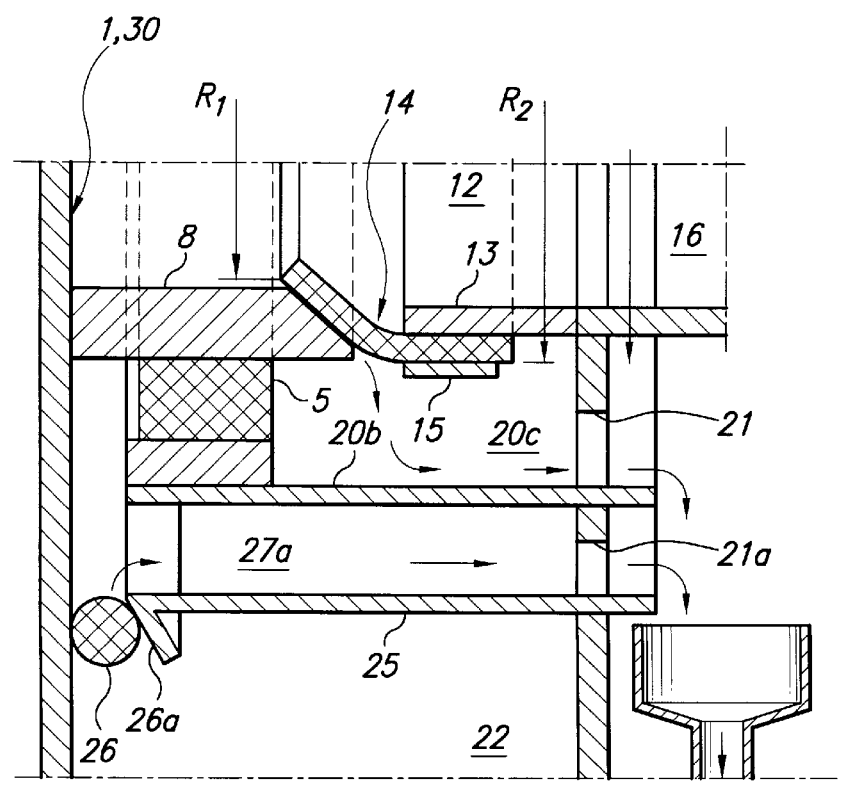
FIG. 9 is an enlarged section through a modified sealing arrangement of the apparatus of Fig. 1.

FIG. 9 shows a modified leakage chamber 20c in which only unfiltered liquid escaping past the sealing member 14 is collected. Filtrate leaking past the sealing member 26 is conducted through a passage 27a, which is separate from the chamber 20c, to a separate outlet 21a. In the leakage chamber 20c there is leakage liquid guiding wall element 20b which extends axially horisontally. The sealing member 26 seals between the annular gable wall 9 and a flange 26a on the truncated cylindrical wall element 25 on the filtrate container 22.

Figure 10:
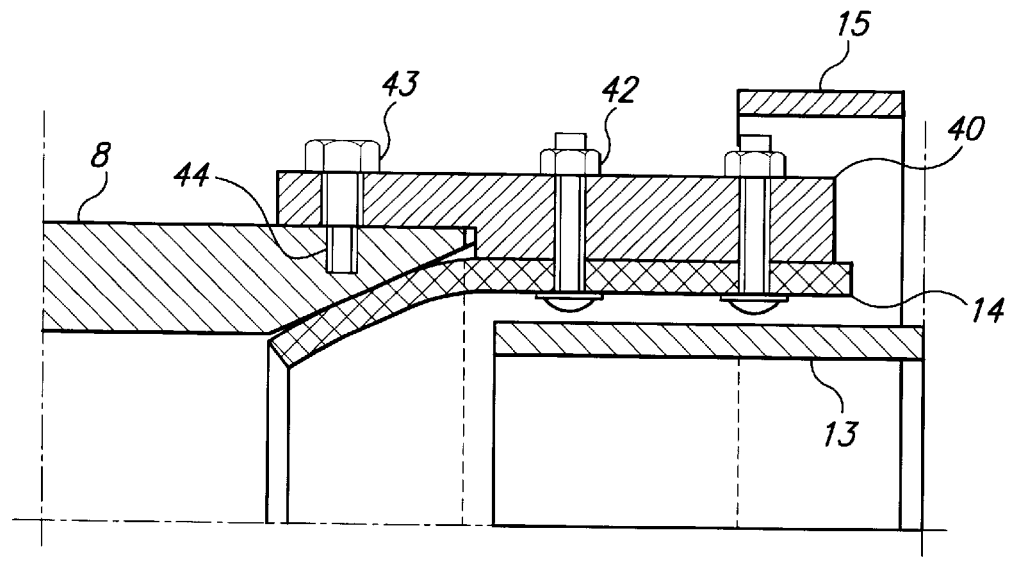
FIG. 10 is an enlarged section of a detail of the apparatus of Fig. 1 illustrating a tool for mounting a sealing means in the apparatus.
Figure 11:
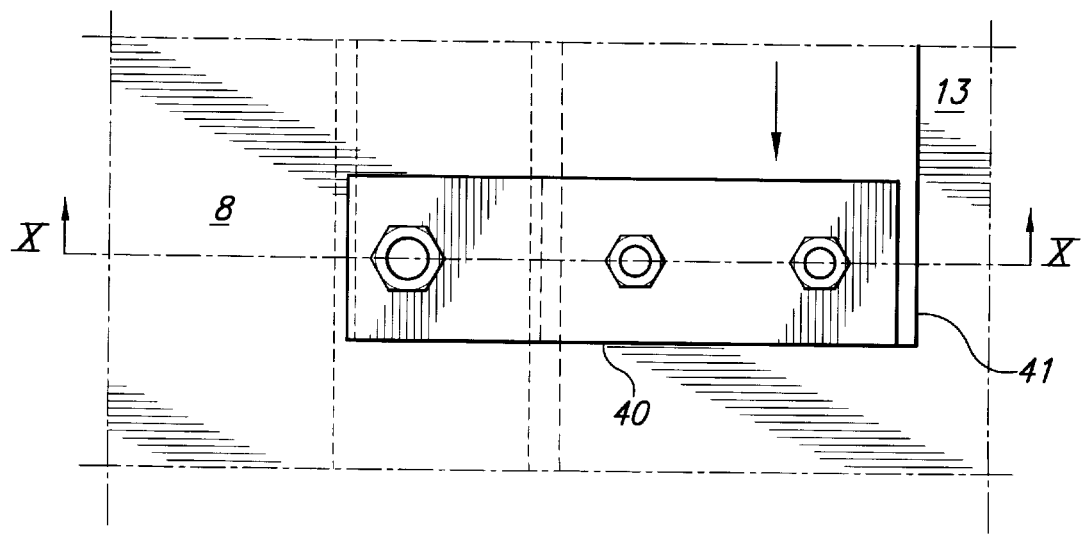
FIG. 11 is a view from above of the detail shown in FIG. 10.

FIGS. 10 and 11 show a tool 40 for mounting the sealing member 14 on the external surface of the truncated cylindrical wall 13. (Alternatively, the wall 13 may be completely cylindrical.) In this case, the rotatable cylindrical wall 8 has an internal conical surface 32 in accordance with the embodiment shown in Fig.5. The tool 40 is elongated and is provided with a first attachment means in the form of two bolts 42, for attaching an end portion 41 of the elongated sealing member 14 on the tool 40, and a second attachment means in the form of a bolt 43, for attaching the tool 40 on the external surface of the wall 8 by screwing the bolt 43 in a threaded hole 44 in the wall 8. In an unmounted condition, the sealing member 14 has the shape of a thin rectangular elastic strip.

In a broad aspect, a method of mounting the elongated strip-shaped sealing member 14 in the filtering apparatus of the invention comprises the steps of:—releaseably attaching the tool 40 on the end portion 41 of the sealing member 14;—releaseably attaching the tool 40 on the rotatable circumferential liquid impervious wall 8 of the hollow body 1 such that said end portion 41 of the sealing member 14 abuts against an internal surface 32 of the wall 8 and extends along the stationary circumferential wall 13 outside of the latter;—rotating the wall 8 and simultaneously guiding the sealing member 14 so that the latter is partly drawn into the circumferential wall 8 to a position, in which the sealing member 14 abuts against the internal surface 32 along its entire length ;—stopping the rotation of the wall 8 when the sealing member 14 is in a desired circumferential position;—releasing and removing the tool 40 from the wall 8 and the sealing member 14; and—clamping the sealing member 14 externally on the stationary circumferential wall 13.

Thus, the tool 40 may be designed otherwise and be provided with attachment means equivalent to the bolts 42 and 43, for instance clamps,hooks or the like. The main thing is that a separate tool, such as the tool 40, is temporarily attached to the wall 8 and the end portion 41 of the sealing member 14, to enable a quick replacement of a deficient sealing member 14 without need for disassembling any other parts of the filtering apparatus.

In the embodiment shown in the drawings the sealing member 14 is attached to the stationary wall 13, which is advantageous in several respects. For example, the sealing member 14 can be designed so that it extends only partly along the circumference of the stationary wall 13, i.e. up above the liquid level 28 in the hollow body 1. Such a design enables a particular advantageous method of mounting the sealing member 14, as described above. However, as an alternative it is of course possible to attach the sealing member 14 on the rotatable wall 8 such that the sealing member 14 abuts against the stationary wall 13, in this alternative, the sealing member 14 has to form an unbroken loop around the entire circumference of the rotatable wall 8 and should be seamless, in order to seal satisfactorily.

What is claimed is:

1. An apparatus for filtering liquids, comprising a hollow body having a wall of filter material, a stationary support structure on which the hollow body is journalled by means of a first bearing at a first side of the hollow body and a second bearing at a second side of the hollow body opposite said first side, such that the hollow body is rotatable about a horizontal axis, the hollow body forming a circumferential liquid impervious wall, at said second side,extending axially a distance from said wall of filter material and defining a circular opening, which is coaxial with said axis, the support structure forming a liquid supplying chamber partly defined by a stationary circumferential wall, which is close to but spaced from said liquid impervious wall and which at least partly extends along the boundary of said circular opening of the hollow body, an inlet to said supplying chamber for a liquid to be filtered, sealing means arranged to seal between said circumferential liquid impervious wall and said stationary circumferential wall of the supplying chamber, whereby liquid to be filtered entering said inlet during operation passes the supplying chamber and said circular opening into the interior of the hollow body, from which a filtrate penetrates the wall of filter material, a coarse fraction discharge means arranged to discharge a coarse fraction of the liquid to be filtered from the interior of the hollow body and from the apparatus, and a filtrate container arranged to receive filtrate from the hollow body and having an outlet for discharging filtrate, characterised in that wall means are arranged to prevent unfiltered liquid leaking past the sealing means from entering the filtrate container.

2. The apparatus of claim 1, wherein said wall means comprises a leakage liquid guiding wall element arranged to guide liquid leaking past the sealing means away from the filtrate container.

3. The apparatus of claim 2, wherein said leakage liquid guiding wall element slopes in the direction away from the filtrate container.

4. The apparatus of claim 1, wherein the filtrate container defines an upper opening for receiving filtrate flowing by gravity from said wall of filter material, and said wall means comprises said circumferential liquid impervious wall of the hollow body, which extends axially beyond said upper opening of the filtrate container, said sealing means sealing between said stationary circumferential wall and said circumferential liquid impervious wall such that liquid leaking past the sealing means flows by gravity axially outside of said upper opening of the filtrate container.

5. The apparatus of claim 1, wherein the support structure forms a leakage chamber arranged to receive liquid leaking past the sealing means.

6. The apparatus of claim 1, wherein the sealing means comprises a resilient sealing member, which is attached to the circumferential wall of the supplying chamber and which abuts against said circumferential liquid impervious wall.

7. The apparatus of claim 6, wherein the resilient sealing member is bent from the circumferential wall of the supplying chamber radially inwardly to said circumferential liquid impervious wall, whereby hydrostatic pressure exerted from liquid present in the supplying chamber and the hollow body aids the sealing member to firmly seal against said circumferential liquid impervious wall.

8. The apparatus of claim 7, wherein said circumferential liquid impervious wall has a sealing surface against which the sealing member abuts, the sealing surface forming an angle ($\alpha$) to a horizontal line in a longitudinal cross-section through the hollow body which is in the range of 15°–90°.

9. The apparatus of claim 8, wherein said circumferential liquid impervious wall has a radial inwardly directed flange defining said circular opening, the sealing member abutting against the flange.

10. The apparatus of claim 8, wherein said circumferential liquid impervious wall has a conical inwardly facing surface, against which the sealing member abuts.

11. The apparatus of claim 7, wherein said stationary circumferential wall has an external surface on which the sealing member is attached and said circumferential liquid impervious wall has an internal surface against which the sealing member abuts.

12. The apparatus of claim 11, wherein the sealing member is attached on said external surface of the stationary circumferential wall by means of a hose clip.

13. The apparatus of claim 1, wherein said second bearing is a slide bearing, said circumferential liquid impervious wall being externally supported by the slide bearing.

14. The apparatus of claim 13, wherein filtrate is prevented from contacting the slide bearing by means of a further sealing means which seals between the hollow body and the filtrate container.

15. The apparatus of claim 14, wherein said further sealing means seals between a first cylindrical wall element arranged on the hollow body outside of said circumferential liquid impervious wall and a second truncated cylindrical wall element arranged on the filtrate container.

16. The apparatus of claim 14, wherein said further sealing means comprises a resilient sealing member, which is attached to the filtrate container and which abuts against the hollow body.

17. The apparatus of claim 13, wherein the support structure forms a leakage passage arranged to conduct filtrate leaking past said further sealing means out of the apparatus.

18. The apparatus of claim 17, wherein the support structure forms a leakage chamber arranged to collect liquid leaking past said sealing means, said leakage passage leading to the leakage chamber.

* * * * *